United States Patent
Weber et al.

(10) Patent No.: US 7,864,103 B2
(45) Date of Patent: Jan. 4, 2011

(54) DEVICE AND METHOD FOR 3D HEIGHT-FINDING AVIAN RADAR

(75) Inventors: Peter T. Weber, Dundus (CA); Timothy J. Nohara, Fonthill (CA)

(73) Assignee: Accipiter Radar Technologies, Inc., Ontario (CA)

( * ) Notice: Subject to any disclaimer, the term of this patent is extended or adjusted under 35 U.S.C. 154(b) by 217 days.

(21) Appl. No.: 11/796,474

(22) Filed: Apr. 27, 2007

(65) Prior Publication Data
US 2008/0266171 A1 Oct. 30, 2008

(51) Int. Cl.
G01S 13/06 (2006.01)
G01S 13/44 (2006.01)
G01S 13/00 (2006.01)

(52) U.S. Cl. .......................... 342/123; 342/89; 342/90; 342/118; 342/134; 342/135; 342/139; 342/140; 342/146; 342/147; 342/149; 342/155; 342/158; 342/175; 342/195

(58) Field of Classification Search ................ 342/27, 342/28, 73–103, 118, 123, 128–159, 175, 342/176, 180, 195, 22, 59, 368–377, 450–465
See application file for complete search history.

(56) References Cited

U.S. PATENT DOCUMENTS

| | | | | |
|---|---|---|---|---|
| 2,444,770 A | * | 7/1948 | Fyler | 342/123 |
| 2,444,771 A | * | 7/1948 | Fyler | 342/123 |
| 2,497,913 A | * | 2/1950 | Rines | 342/123 |
| 2,519,397 A | * | 8/1950 | Ranger | 342/123 |
| 2,597,348 A | * | 5/1952 | Longacre et al. | 342/123 |
| 2,624,874 A | * | 1/1953 | Rines | 342/123 |
| 2,822,537 A | * | 2/1958 | Bartelink | 342/123 |
| 2,946,996 A | * | 7/1960 | Wassell | 342/123 |
| 3,070,795 A | * | 12/1962 | Chambers | 342/147 |
| 3,072,903 A | * | 1/1963 | Meyer | 342/89 |
| 3,214,755 A | * | 10/1965 | Blass et al. | 342/123 |
| 3,267,270 A | * | 8/1966 | Smidowicz | 342/123 |
| 3,267,271 A | * | 8/1966 | Kindle et al. | 342/123 |
| 3,274,593 A | * | 9/1966 | Varela et al. | 342/147 |
| 3,448,450 A | * | 6/1969 | Alfandari et al. | 342/157 |
| 3,697,990 A | * | 10/1972 | Emch | 342/123 |

(Continued)

FOREIGN PATENT DOCUMENTS

CA 2504507 10/2006

(Continued)

OTHER PUBLICATIONS

"Affordable, Real-Time 3-D Avian Radar Networks for Centralized North American Bird Advisory Systems"; Peter Weber, et al., Aug. 2005; pp. 1-8.

*Primary Examiner*—Bernarr E Gregory
(74) *Attorney, Agent, or Firm*—R. Neil Sudol; Henry D. Coleman; William J. Sapone

(57) ABSTRACT

A height-finding 3D avian radar comprises an azimuthally scanning radar system with means of varying the elevation pointing angle of the antenna. The elevation angle can be varied by employing either an antenna with multiple beams, or an elevation scanner, or two radars pointed at different elevations. Heights of birds are determined by analyzing the received echo returns from detected bird targets illuminated with the different elevation pointing angles.

40 Claims, 4 Drawing Sheets

Switched-beam avian height-finding radar apparatus.

U.S. PATENT DOCUMENTS

| | | | | |
|---|---|---|---|---|
| 3,971,020 A | * | 7/1976 | Howard | 342/129 |
| 4,150,378 A | * | 4/1979 | Barton | 342/123 |
| 4,158,840 A | * | 6/1979 | Schwab | 342/123 |
| 4,649,389 A | | 3/1987 | Taylor, Jr. et al. | |
| 4,963,888 A | * | 10/1990 | Taylor et al. | 342/90 |
| 5,134,410 A | * | 7/1992 | Shrader | 342/90 |
| 5,774,088 A | * | 6/1998 | Kreithen | 342/22 |
| 6,819,285 B1 | | 11/2004 | Stockman et al. | |

FOREIGN PATENT DOCUMENTS

| | | | |
|---|---|---|---|
| EP | 0033059 A2 | * | 8/1981 |
| GB | 2176073 A | * | 12/1986 |
| JP | 59061790 A | | 4/1984 |

* cited by examiner

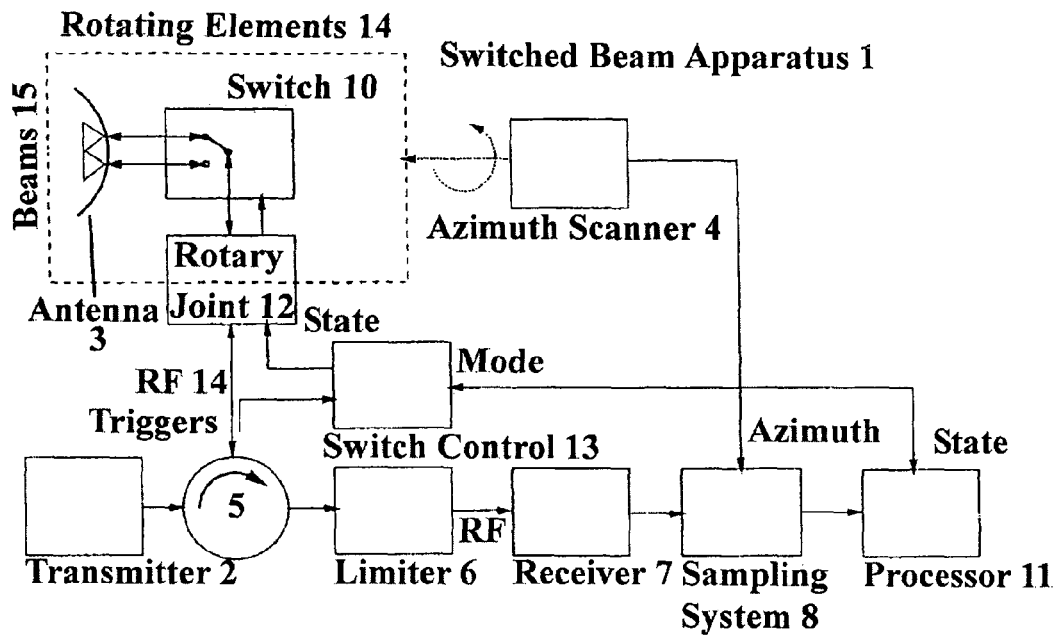
Figure 1: Switched-beam avian height-finding radar apparatus.
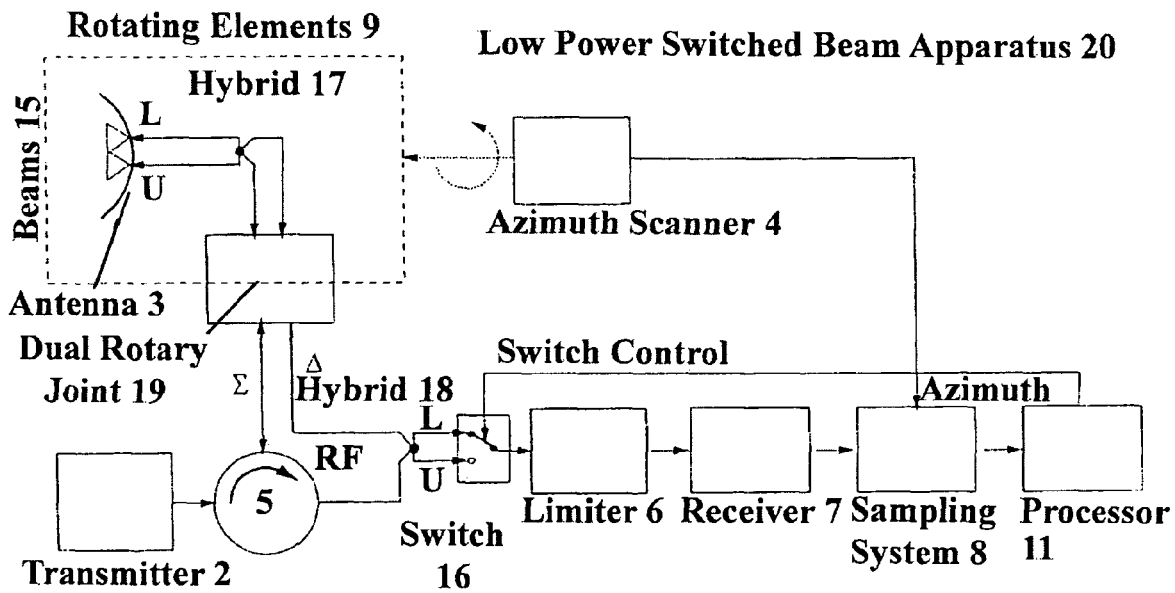
Figure 2: Low-power-switched beam avian height-finding radar apparatus.

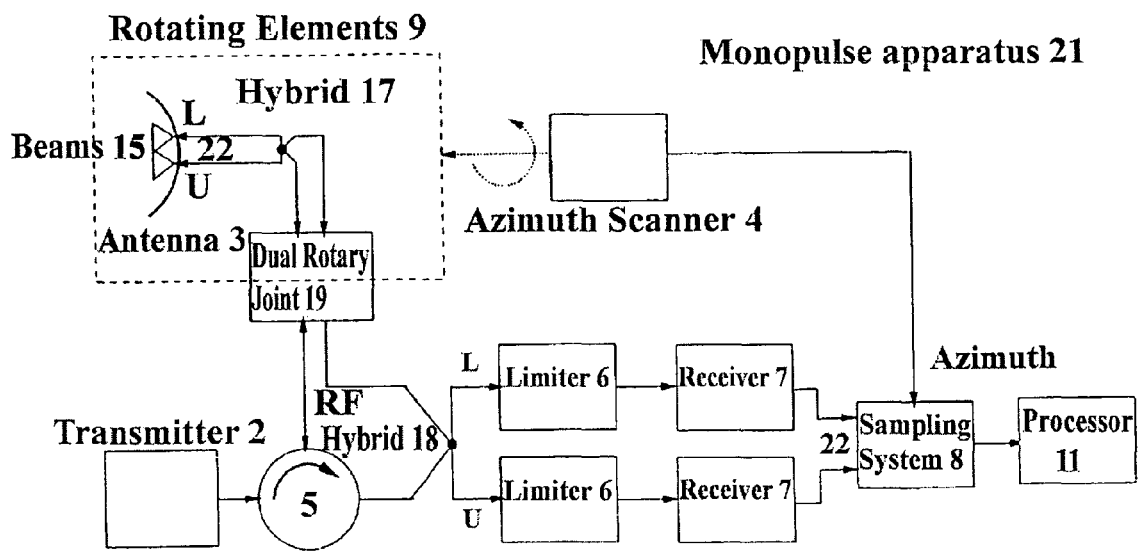
Figure 3:
Monopulse avian height-finding radar apparatus
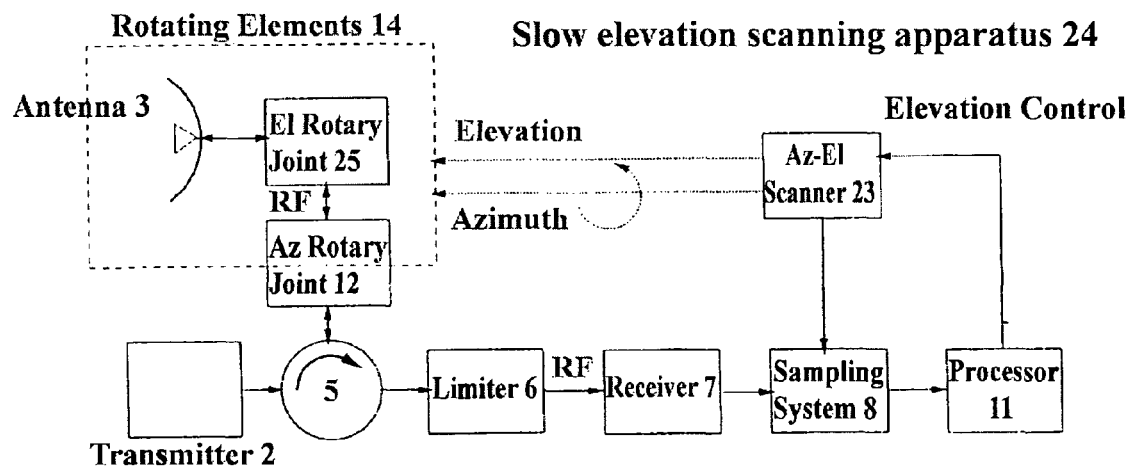
Figure 4: Slow-elevation-scanning avian height-finding radar apparatus

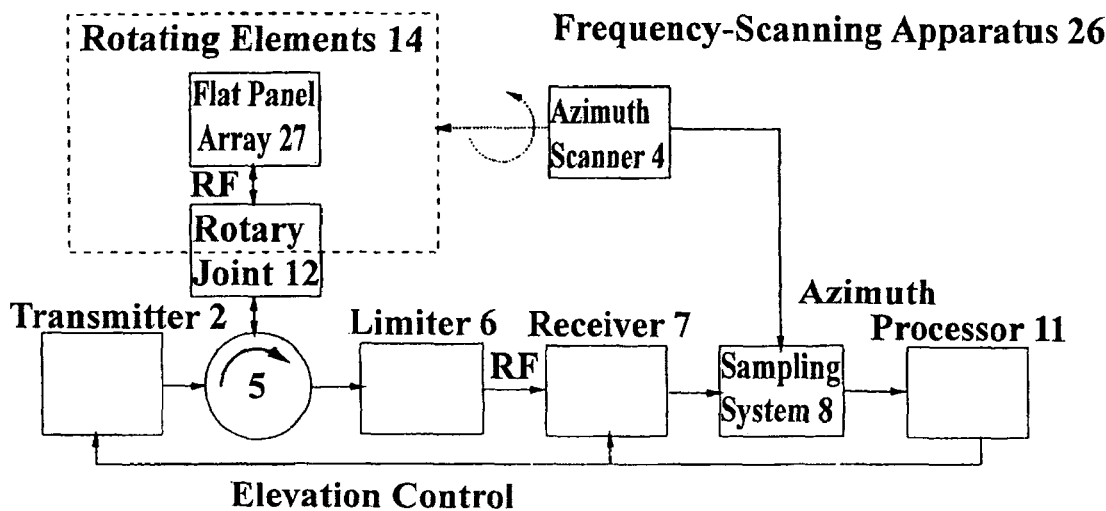
Figure 5: Frequency-scanning avian height-finding radar apparatus
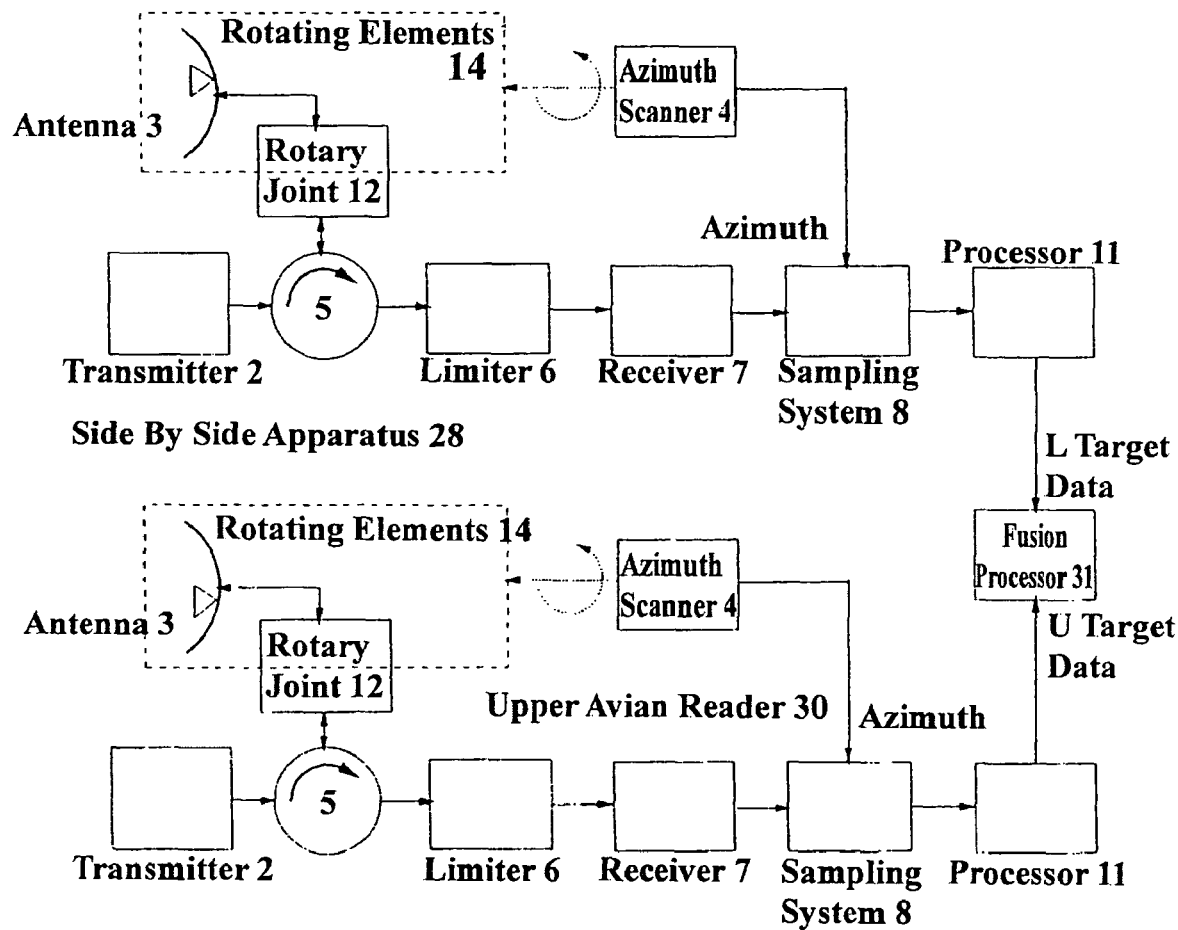
Figure 6: Multiple side-by-side avian height-finding radar apparatus

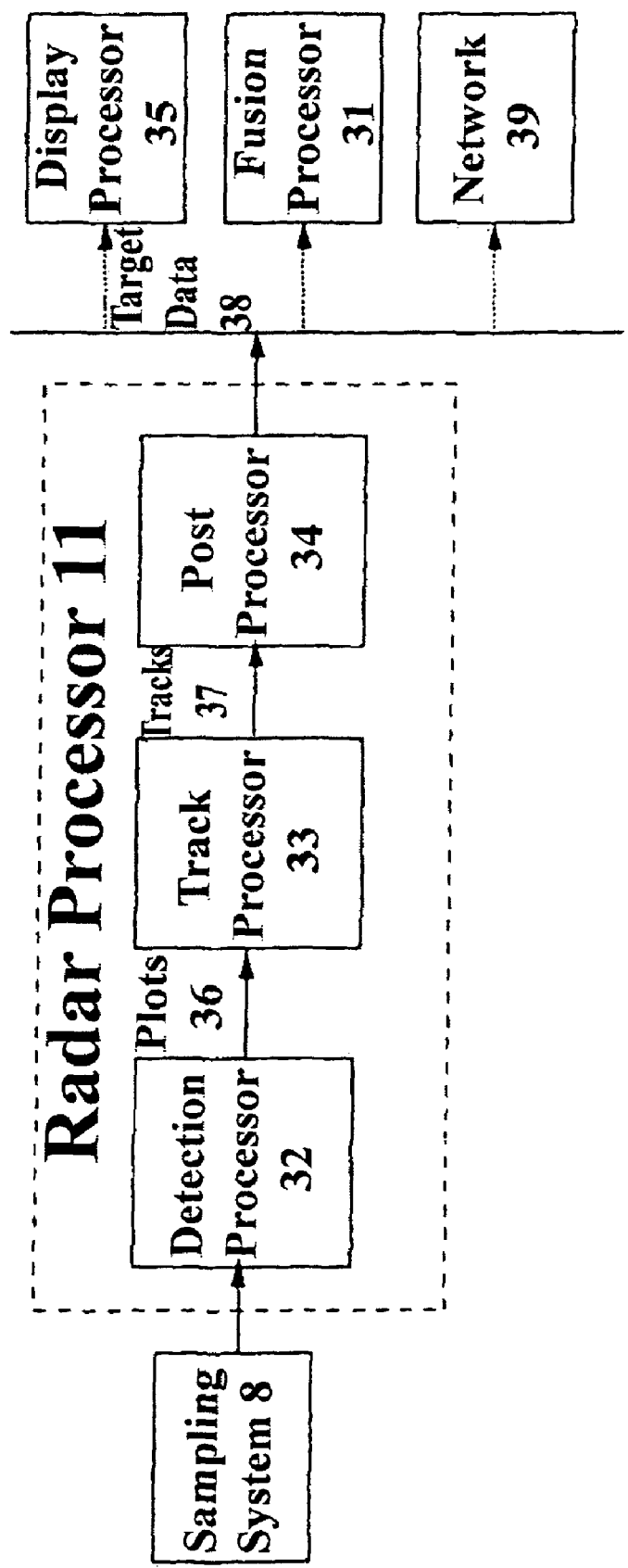
Figure 7: Radar Processor subsystems and output destinations

DEVICE AND METHOD FOR 3D HEIGHT-FINDING AVIAN RADAR

FIELD OF THE INVENTION

This invention relates to ground-based radar systems and methods. The invention relates more additionally and more specifically to radar target detection, tracking and estimation of target height. The invention is particularly useful in radar surveillance of birds and other airborne targets.

BACKGROUND OF THE INVENTION

Avian radars are used to track birds in flight in the vicinity of airfields, wind farms, communications towers, and along migration routes. Birds are a significant hazard to aviation safety. Applications that require bird monitoring are the bird aircraft strike hazard (BASH) problem and the natural resource management (NRM) problem. Billions of dollars in damage to aircraft and significant loss of life have been recorded due to birds flying into aircraft, particularly during take-off and landing in the vicinity of airports.

The danger associated with birds depends on their altitude (among other factors). Users of bird detection and tracking radars need to know the height of tracked birds. State-of-the-art avian radars provide target tracking with localization in only two dimensions. These systems do not estimate height (within the beam extent) in any real sense. Thus avian radars need altitude estimation of bird (or other airborne) targets. They need the means to estimate target height in a manner that is practical and economical. The purpose of the current invention is to provide next generation avian radars with such means, thereby overcoming current limitations in the state-of-the-art.

State-of-the-art avian radars use inexpensive, commercial-off-the-shelf (COTS) X-band marine radar transceivers, fitted with slotted-waveguide array antennas, as well as parabolic reflector or Cassegrain (dish) antennas. The raw received baseband signals are digitized, followed by detection and tracking of bird targets. State-of-the-art avian radars provide continuous, day or night, all-weather, situational awareness with automated detection, localization and warnings of hazards. They provide high-quality target track data with sophisticated criteria to determine potentially dangerous target behavior, as well as communication of alerts to users who require that information. They also minimize operator interaction.

State-of-the-art avian radars features include:
- Low-cost, high-performance radar antennas and transceivers mounted on ground-based pedestals
- Radar processing that can reliably detect and track small, low-RCS (radar cross-section), maneuvering targets in dense target and clutter environments
- Automatic hazard detection and alert capability to remote users
- The formation of radar networks to provide wide-area coverage
- Low cost of operation
- Low life cycle costs
- Data and analysis support for research and development COTS marine radars are very inexpensive. These marine radars exhibit surprisingly good hardware specifications. However, as-is, these radars deliver mediocre performance for bird targets because of their primitive signal processing. Combining a COTS marine radar with a digitizer board and a software radar processor that runs on a COTS personal computer (PC) and a parabolic dish antenna forms a state-of-the-art avian radar, one with a very limited three-dimensional (3D) localization capability. Modifying such radars via custom antennas and processing allows height estimation and coverage.

Slotted-waveguide array antennas are used to provide two-dimensional (2D) localization (i.e. range and azimuth, which can be translated to latitude and longitude). These systems provide good volume coverage due to the typically larger vertical (elevation) beamwidth, which is on the order of 20 degrees. Such systems cannot provide useful height estimates of tracked targets when the radar is spinning horizontally in its usual orientation. This is because the beam uncertainty in the $3^{rd}$ dimension (elevation), which is on the order of the beam extent, is too large. For example, the elevation beam extent or height uncertainty for a target at a distance of just 1 km from the radar is about 1,000 feet. This means that if both a plane and a bird are being tracked by the radar at a distance of 1 km away, the radar cannot tell whether the two targets are 1,000 feet apart (i.e. one is on the ground and the other is at the upper edge of the vertical beam, 1,000 feet off the ground) or whether they are at the same altitude where a collision could occur. While some radar configurations orient the slotted-array antenna so that it spins vertically (rather than horizontally) to get a measure of height, see *Nocturnal Bird Migration over an Appalachian Ridge at a Proposed Wind Power Project*, Mabee et al, Wildlife Society Bulletin 34(3), 2006, page 683, they still can only operate as 2D radars. In order to measure height, they can no longer provide 360-degree azimuthal coverage (which a conventional azimuth-rotating radar provides).

Parabolic reflector or Cassegrain (dish) antennas are used today to provide a very limited 3D localization capability. These antennas employ a single beam (pencil shaped), fixed in elevation, but rotating in azimuth. The azimuth rotation results in the usual 2D, 360-degree coverage with localization in range-azimuth or latitude-longitude. However, by using a narrow pencil beam (say between 2 and 4 degrees wide), the height uncertainty reduces significantly as compared to the 20 deg slotted-array antenna. Using the previous example, with targets at a distance of 1 km from the radar and a 4-degree dish antenna, height estimates with uncertainties on the order of 200 feet are now possible. While providing useful height information at very short ranges, the height estimates are still of limited use at further ranges. Also, volume coverage is restricted accordingly with the narrower pencil beam. The present invention seeks to overcome these limitations by providing better 3D localization capabilities. In particular, means are disclosed herein to provide both better height estimates (reduced height uncertainty) and greater volume coverage.

Merrill I. Skolnik in his *Introduction to Radar Systems, $2^{nd}$* Edition, McGraw-Hill Book Company 1980 and his *Radar Handbook, $2^{nd}$* Edition, McGraw-Hill, Inc., 1990, describes height-finding radars that use nodding horizontal fan beams. These radars are steered to the bearing where targets have been detected by an independent 2D air-surveillance radar. These height-finding radars can not get height estimates for more than 20 or so targets per minute, and have problems with azimuth-elevation (Az-El) ambiguities in dense target environments. Military airborne and land-based tracking radars provide height information for a single target only (via closed-loop steering in both dimensions). They use monopulse or sequential lobing techniques to obtain the off-boresight error signals, but like the height-finding radars, are unable to perform 3D surveillance. Military 3D surveillance radars, on the other hand, employ rotating phased array antennas that form either multiple receive beams or rapidly electronic-scanning pencil beams. See *Radar Applications*, Merrill I. Skolnik, IEEE Press New York, 1987. Like these radar systems, the present invention is also true 3D surveillance; its antenna rotates in azimuth while estimating height. However, the present invention is low-cost, while military 3D radar systems are orders of magnitude more expensive, because of their phased array antennas. The present invention does not use expensive phased arrays but uses marine radars and PC-based processing to achieve considerable cost reduction, especially as compared to military systems.

The U.S. and Canada have conceived and are developing a North-American Bird Strike Advisory System (NABSAS). This system will monitor and provide information to users on bird activity and hazards (to aircraft) at numerous sites throughout North America. It includes a network of avian radars as part of its data sources, and bird heights as well as bird ground tracks are desired. 3D avian radars in accordance with the present invention will provide ideal sources of bird information for this Advisory System.

It will be obvious to those skilled in the art that the same improvements described herein are applicable to low-cost radars used in other applications such as homeland security. Any radar with plot extraction (i.e. detection) could use the apparatus and method described herein to estimate height of detected targets. Examples of such radars are described in US Patent Application Publication No. 2006/0238406 entitled "Low-cost, High-performance Radar Networks," which is incorporated herein by reference.

OBJECTS OF THE INVENTION

It is an object of the present invention to provide improved state-of-the-art avian radar systems that extend current 2D target localization capabilities to 3D ones.

A primary object of the current invention is to provide an affordable 3D avian radar system capable of localizing bird targets and other targets in three dimensions (latitude, longitude, and height).

Another object of the current invention is to provide the means to affordably upgrade existing 2D avian radar systems so that they can localize bird targets in 3D.

A key object of the present invention is to provide the means of producing significantly more accurate target height estimates, as compared to conventional 2D avian radars, while not reducing volume coverage.

Another object of the present invention is to provide the means of producing significantly greater volume coverage, as compared to conventional 2D avian radars employing dish antennas, while not reducing the accuracy of target height estimates.

Yet another object of the present invention is to improve the accuracy of target RCS estimates.

A final object the present invention is to provide a radar system that enables a determination as to whether a bird and an aircraft are likely to collide.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein.

SUMMARY OF THE INVENTION

The present invention concerns practical improvements over state-of-the-art 2D avian radar systems, including improvements in antenna designs and related and necessary radar transceiver modifications. The improvements include the following features:

Inexpensive and incremental to current systems
   Extended height coverage
   Improved height estimation within the covered extent
   Low sidelobe response at ground level (zero elevation)
   Narrow-beam azimuth response In accordance with the present invention, the following general radar system designs provide (to varying degrees) the desired features listed above:

1. A radar system whose antenna has multiple stacked pencil beams, and that switches between them rapidly in time (sequential lobing)
2. A radar system employing a monopulse antenna that receives on multiple stacked beams simultaneously
3. A radar system with a single pencil beam that slowly scans up and down in elevation, while rotating rapidly in azimuth. Such a system will not get simultaneous height coverage and estimation, but will get them over time.
4. Two single-beam radar systems operating side-by-side at different fixed elevation angles.

For the present invention, height-finding antennas and techniques are applied to avian radar systems in order to provide a means for providing height information about detected bird targets for BASH and NRM applications. The invention uses custom-designed antennas preferably fitted to a COTS radar transceiver (although using a custom-built radar transceiver to facilitate integration still falls in the spirit of this invention); and novel radar signal and data processing algorithms to estimate the height of detected bird targets.

A 3D radar system comprises, in accordance with the present invention, an antenna provided with means for varying its effective pointing direction in elevation, a radar transmitter operatively connected to the antenna for generating a radar signal for emission via the antenna, a radar receiver operatively connected to the antenna, an azimuth scanner operatively coupled to the antenna for rotating same about an axis, and a processor operatively connected to the receiver, the processor being configured for detecting and localizing airborne targets in azimuth and range, the processor being further configured for estimating a height of each detected target height based on relative amplitudes of echo returns as a function of elevation pointing direction of the antenna.

A related method of determining the heights of airborne targets comprises, in accordance with the present invention, (a) operating a radar system to illuminate and detect the targets, the radar system having at least one radar antenna, (b) during the operating of the radar system, varying an antenna elevation pointing angle of the radar antenna, and (c) estimating detected target heights in accordance with variation in amplitude of echo returns as a function of antenna elevation pointing angle.

A first form of the present invention utilizes a switched-beam concept that has an antenna with at least two selectable radar beams pointed at different elevation angles. Each beam is preferably a pencil beam with all beams having the same or similar azimuth response. The azimuth beamwidth need not equal the elevation beamwidth, as is the case when conventional dishes are used; different applications will have different preferred aspect ratios. Each beam preferably has reasonably low worst sidelobes (typically −20 dB), and has even lower ones at zero elevation (typically −25 dB or lower). The lowest beam is preferably elevated enough that zero-elevation ground returns are in its low sidelobes; and the lowest beam may be elevated even higher. The second beam is elevated typically between ½ and 2 beamwidths above the lowest one, and any other higher beams will have similar separation. A preferred embodiment has 1° beamwidth in azimuth, 3° beamwidth in elevation, and has the 2 beams elevated at 5° and 9°.

A desirable option is to have the actual elevation of the beams adjustable mechanically when the radar is offline (e.g. by tilting/rotating the antenna structure to desired setting and fixing it in place). In the above example, beams at 5° and 9° could be the nominal (flat) setting, but the structure could be tilted up (i.e. adjusted) so that they are at say 10° and 14°. An electrical control could be provided as well so that a radar operator could effectuate this mechanical adjustment using a joystick, slider or some other convenient software or hardware control interface.

A preferred embodiment of a switched-beam antenna in accordance with the present invention is a reflector antenna with two or more vertically stacked feed horns, each horn being a simple single-mode flared waveguide type. Offset feed designs may be preferred for achieving lower sidelobes (eliminating feed blockage).

The antenna preferably rotates continuously 360° in azimuth at-least 24 revolutions per minute (RPM) while transmitting and receiving. It may be desirable to have a selectable rotation rate. The rotating antenna is typically mounted near ground level; it could be on the roof of a trailer or a small building, or it could have its own dedicated structure. Some sites may require the antenna to be raised to 10 feet or so above ground in order to clear nearby obstructions. The rotating antenna is usually protected from (or immune to) the environment (wind, rain, dirt, etc.); any protective measures should not significantly distort beam patterns nor raise sidelobes above tolerable levels. The rotating antenna boresight must be (mostly) unobstructed from mechanical apparatus; some applications may tolerate an obstructed azimuth sector.

A high-power switch, usually in the 2 kW to 60 kW range to match the power provided by a COTS marine radar transceiver, rotates with the antenna and switches between the beams for both the transmitted and the received signals. The processor preferably controls the switch, and can switch between beams on a per-pulse basis according to an arbitrary programmed pattern. Switching preferably occurs during the dead time between the longest-range return and the start of the next transmitted pulse. A rotary joint with a slip ring connection provides a path for RF, power for the switch, and switching control signals while the switch and antenna rotate in azimuth. A wireless connection, a battery, and/or some other state-of-the-art schemes, could alternatively provide RF, power and/or control to the switch, thereby obviating the need for a specialized rotary joint.

An alternative switched-beam implementation does not require a rotating or a high-power switch. A low-power switch operates on only the received (Rx) signals. Transmission occurs out of both beams (or out of a third beam that covers both). RF is delivered to the beams via the sum channel of a dual-channel rotary joint and a hybrid. The Rx signals from both beams are delivered to the switch via the hybrid, the sum and difference channels of the dual-channel rotary joint and another hybrid. Somewhat poorer elevation discrimination will result, because transmission will be through both beams.

A second form of the present invention is a monopulse system, which is an alternative to a switched-beam one, with the likelihood of higher system cost and complexity. A monopulse system transmits out of a single beam on every pulse, and simultaneously receives signals from two distinct beams on every pulse. Beam shape requirements are similar to the switched-beam concept. A monopulse system needs two receive beams stacked in elevation, and a transmit beam that is just wide enough to cover both receive beams. Transmission occurs out of both beams (or out of a third beam that covers both). RF is delivered to them via the sum channel of dual-channel rotary joint and through a hybrid. Monopulse requires two receive paths, each from the antenna through the sampling system. The received signals from both beams are delivered to the receivers via the hybrid, the sum and difference channels of the dual-channel rotary joint and through another hybrid.

A third form of the present invention is the slow-elevation-scanning system, which is another alternative to switched beam. A single beam is slowly nodded up and down in elevation while it rapidly rotates in azimuth (helical scan). Nodding could be mechanical or electronic.

Nodding is slow enough that targets remain within the beam for several consecutive scans, long enough to form tracks. The apparatus must be able to control nodding while rotating in azimuth. Elevation coverage is not obtained instantaneously, but over periods of a few minutes. This is the scheme's key disadvantage: It does not detect every bird, but gets the hourly, daily, seasonal activity (in this respect, it is like a weather radar). This scheme has some key advantages over the multi-beam solutions. It is more flexible in the choice of coverage region (e.g. could look between 5° and 10° during day, 10° and 20° at night, etc.). It is a much simpler increment to the currently existing solutions: The antenna is a simple conventional dish, no modifications to the receiver and sampling system are required, and the changes to the processing are confined to the interpretation of the track data. The processor needs to be kept informed of the azimuth (Az) and elevation (El) positions (via signals from scanner). The processor preferably controls elevation according to operator-set parameters.

A fourth form of the present invention, which is an alternative to the switched-beam system, involves using two (or more) independent single-beam avian radar systems operating side-by-side with their respective antennas set at different fixed elevation angles. Each avian radar detects and preferably tracks targets within its respective coverage volume, using its own receiver and processor. Detections and/or tracks from each radar are combined in a downstream fusion processor, which estimates height for each target based on its relative echo amplitudes from each of the radars.

Regardless of the form of the present invention, for a given target, its height estimate is based on the ratio of amplitudes received from each beam in the target's range-azimuth cell, at as close to the same time as possible. Preferably, the height-estimation algorithms use interpolation to determine precisely where in elevation such a ratio would occur, thereby producing a better height estimate. The radar processor detects targets in each beam using state-of-the-art detection methods known to those skilled in the art and preferably tracks targets as well, using state-of-the-art multi-target tracking algorithms known to those skilled in the art such as those detection and tracking algorithms described in U.S. patent application Ser. No. 11/110,436 Low-cost, High-performance Radar Networks] which are included herein by reference. A multi-target tracker is preferably included in the processor as it facilitates target track association (across beams) and allows for smoothing of the noisy per-detection height estimates using methods known to those skilled in the art, thereby producing better height estimates. Various methods known to those skilled in the art can be used for displaying the height of detected targets to users, including: color, intensity, and/or numerical displays indicating the height for each target, as well as statistical displays such as histograms which characterize height distribution for several or all targets.

A related advantage of having height information is that more accurate estimates of target radar cross-section (RCS) are obtainable, aiding the classification of targets. When the radar system knows both the azimuth and elevation angles associated with a particular target, then target amplitude can be directly converted to RCS using methods known to those skilled in the art. If the system does not know where the target is relative to the (elevation) center of beam, then the target amplitude has an unknown beam gain factor.

BRIEF DESCRIPTION OF THE DRAWINGS

FIG. 1 is a block diagram of a switched-beam avian height-finding radar apparatus in accordance with the present invention.

FIG. 2 is a block diagram showing a low-power-switch version of the switched-beam apparatus shown in FIG. 1.

FIG. 3 is a block diagram of a monopulse avian height-finding radar apparatus in accordance with the present invention.

FIG. 4 is a block diagram of a slow-elevation-scanning avian height-finding radar apparatus in accordance with the present invention.

FIG. 5 is a block diagram of a frequency-scanning switched-beam avian height-finding radar apparatus in accordance with the present invention.

FIG. 6 is a block diagram of a multiple, side-by-side avian height-finding radar apparatus in accordance with the present invention.

FIG. 7 is a block diagram of the radar processor subsystems and output destinations.

DETAILED DESCRIPTION

A block diagram of a switched-beam avian height-finding radar apparatus 1 in accordance with the present invention is shown in FIG. 1. Characteristics of each block are as follows. The avian height-finding radar apparatus 1 includes a radar transmitter 2 that is typically noncoherent and transmits pulses of constant width at a constant pulse repetition frequency (PRF) at X-band or S-Band (or other bands). Radar apparatus 1 typically has either a continuously rotating or sector-scanning antenna 3. Antenna 3 is typically mounted near ground level within (or near) the area to be monitored.

The azimuth scanner 4 rotates the antenna 3 continuously in azimuth while the antenna 3 is transmitting and receiving. The circulator 5, limiter 6 and receiver 7 are conventional radar components such as those found in marine radar transceivers. The sampling system, 8 digitizes the radar return video signal.

The switched-beam antenna 3 has (at least) 2 selectable radar beams 15 pointed at different elevation angles. The high-power switch 10 rotates with the antenna 3 and switches between the beams for both the transmitted pulse and the received signals. The processor 11 controls the switch. The rotary joint with a slip ring connection 12 provides a path for RF, power for the switch, and controls switching while the switch and antenna rotate in azimuth.

The switch control circuit 13 drives the switch 10 into its respective states. It preferably extracts pulse transmission timing information from the RF signal 14 (or from transmitter exciter signals). It forms switch state signals after programmed delays from the sensed RF signal, with delays and switching pattern designated by processor 11. Preferably, the switch changes state every pulse causing the beams to alternate in a pulse-to-pulse fashion.

An alternate switched-beam implementation 20 is shown in FIG. 2. The low-power switch 16 does not rotate with the antenna 3 and operates on the Rx signals only. Transmission occurs out of both beams 15. RF is delivered to them via the sum channel of dual-channel rotary joint 19 and through hybrid 17. The received signals from both beams are delivered to the switch via the hybrid 17, the sum and difference channels of dual-channel rotary joint 19 and through hybrid 18.

A monopulse avian height-finding radar apparatus 21 shown in FIG. 3 is an alternative to switched-beam ones. RF pulses are delivered to both beams 15 via the sum channel of dual-channel rotary joint 19 and through hybrid 17. The two receive paths (L and U) 22, each run from the antenna 3 through to the sampling system 8. The received signals from both beams 15 are delivered to the receivers via the hybrid 17, the sum and difference channels of dual-channel rotary joint 19 and through hybrid 18.

The slow-elevation-scanning avian height-finding radar apparatus 24 shown in FIG. 4 is another alternative in accordance with the present invention. The antenna 3 is simpler than the above designs, with only a single beam. The Az-El scanner 23 moves the antenna 3 through its helical scan. The Elevation Rotary Joint 25 and Azimuth Rotary Joint 12 allow RF transmission while scanning in both dimensions.

Scan-to-Scan Elevation Switching is an alternative mode for a switched-beam system. The antenna remains at one elevation setting for one scan, is switched to the other for the next scan, and then back, etc. This doubles the revisit time for targets only visible in one beam, meaning a reduction in tracking performance. This solution could be used if a switched beam antenna was available, but switching takes too long to apply it on alternate pulses (for example, in the case of a mechanical switch). The processor would analyze the alternating variation in amplitude over several scans in order to derive height for any track. The tracker must be set to handle targets that are only detected in every other scan, which will happen for those at heights not within both beams. The system could also be configured to mimic slow elevation scanning, i.e. spend several consecutive scans at one elevation setting, then switching to the next, etc.

The frequency-scanning apparatus 26 shown in FIG. 5 is an alternative switched-beam system, where tuning of the transceiver RF (from pulse to pulse) scans the beam in elevation, giving continuously selectable beam positions. This gives much flexibility in the operator's control of elevation coverage. The apparatus employs a flat-panel frequency-scanned phased-array antenna 27. Such an antenna delivers phased-array performance without the need for phase shifters, at much reduced cost. Lower sidelobes (than typical reflectors) can be achieved by careful design of the aperture taper. The radar transmitter 2 and receiver 7 must be rapidly tunable over a fairly wide bandwidth, which prevents the apparatus from using inexpensive COTS marine radars.

An alternative height-finding avian radar system 28 shown in FIG. 6 consists of two (or more) side-by-side avian radars, where one radar subsystem 29 operates at a lower elevation angle, the other radar subsystem 30 at higher one. Each radar subsystem 29 and 30 has its own receiver 7, sampling system 8 and processor 11. Tracks (or detections) are combined in fusion processor 31, which then derives height estimates for detected targets.

Other scanning alternatives are possible, but the above are more suited to avian radars, where 360° azimuth coverage is usually required. One could scan quickly mechanically upand-down (or around) in elevation while rotating slower in azimuth. One could scan in 2D in a back-and-forth raster mode (electronic, mechanical, or both). While a phased-array antenna could be integrated into the radar sensor of the present invention, it is not a preferred embodiment of the present invention due to the significantly higher cost anticipated for such an antenna.

Preferably, embodiments of a radar system as disclosed herein aim to take advantage of standardized COTS technologies to the maximum extent possible in order to keep the system cost low and to provide for low life cycle costs associated with maintainability, upgrade ability and training. Preferably, COTS marine radars are used as the radar sensor in order to minimize sensor costs. The radar processor 11 itself incorporates sophisticated algorithms and software that runs on COTS personal computers (PC). Preferred embodiments provide a low-cost, high-performance, land-based radar sensor designed for avian radar applications. Preferred embodiments digitize the raw radar video signal from the marine radar receiver and use a PC-based radar processor with sophisticated processing such as the detection, tracking and display processing described in US Patent Application Publication No. 2006/0238406 entitled "Low-cost, High-performance Radar Networks," which is incorporated herein by reference and further described below.

The radar processor 11 shown in FIG. 7 preferably incorporates a detection processor 32, a track processor 33, a post-processor 34 and a display processor 35. The detection processor 32 performs radar signal processing functions known to those skilled in the art such as scan-conversion, clutter suppression through the use of adaptive clutter-map processing to remove ground and weather clutter, sector blanking to suppress detections and interference in regions that are not of interest, adaptive thresholding such as constant false alarm rate (CFAR) processing, and digital sensitivity time control (STC). The detection processor declares the presence and location of target plots 36 preferably on each radar scan. The information on each plot preferably includes time, range, azimuth, elevation (beam center), and amplitude. The track processor 33 sorts the time-series of detections (also called plots) into either target tracks 37 (confirmed targets with estimated dynamics) or false alarms. The information on each tracked target preferably includes time and estimated 3D spatial position, velocity, and RCS.

A plot-to-track association algorithm provides means to resolve ambiguities produced by multiple targets, missed detections, false alarms, and maneuvering targets, whereas a track filtering algorithm provides high quality estimates of target dynamics for the association algorithms and for the display processor. The track processor preferably uses a sophisticated plot-to-track association algorithm called MHT and preferably uses an advanced track-filtering algorithm called Interacting Multiple Model (IMM) filtering as described in US Patent Application Publication No. 2006/0238406.

For the apparatus shown in FIG. 1, FIG. 2, FIG. 3, FIG. 4 and FIG. 5, processor 11 also includes the height-finding algorithms in accordance with the present invention. For the side-by-side apparatus in FIG. 6, a separate fusion processor 31 performs the height-finding calculations to produce target height estimates.

The post-processor 34 (FIG. 7) analyzes the tracks data 37 and preferably distributes target data 38 to either a network 39 or fusion processor 31. Post-processor 34 can also send real-time target data 38 to a local display processor 35, which displays tracks in real-time on an operator's monitor. The target data 38 consists of tracks data 37 refined into user-specific products such as alerts, statistical summaries, reduced subsets, etc.

The height-finding algorithms in accordance with the present invention, for a given target, are based on the ratio of amplitudes received from each beam in the target's range-azimuth cell, at as close to the same time as possible. Antenna calibration data (previously acquired) are used to translate the target amplitude ratio to an estimate of the target elevation angle, which can then be translated to a height estimate through simple geometry. Preferably, the height-estimation algorithms use interpolation to determine precisely where in elevation such a ratio would occur, thereby producing a better height estimate. Some nonlinear function of amplitude could also be used in place of amplitude. The elevation beam pattern for each beam of the antenna needs to be calibrated, or alternatively, the ratio itself. Any antenna calibration method known-to-those skilled in the art may be used to generate the required calibration data and table look-up methods known to those skilled in the art may be used to directly provide height estimates. The radar processor 11 detects targets in each beam using state-of-the-art detection methods known to those skilled in the art and preferably tracks targets as well, using state-of-the-art multi-target tracking algorithms known to those skilled in the art such as those detection and tracking algorithms described in US Patent Application Publication No. 2006/0238406, which are included herein by reference.

A multi-target tracker, such as the aforementioned MHT/IMM automatic multi-target tracker which is ideal for surveillance tracking with many targets, is preferably included in the processor 11 as it facilitates target track association (across beams) and allows for smoothing of the noisy per-detection height estimates using methods known to those skilled in the art, thereby producing better height estimates. Consider the case where the antenna switches between two elevation beams every pulse. For each full azimuth scan (revolution) of the antenna, two scan matrices of radar echo data are produced, one for each of the two beams. Detections are automatically computed for each of the scan matrices, and this process is repeated continuously from scan to scan. Each detection includes a location (e.g. range/azimuth) and an amplitude (or some nonlinear function of amplitude). Without a multi-target tracker, determining which detections from the first scan matrix are associated with which detections in the second scan matrix (i.e. arise from the same respective targets) is a very difficult task. This is so because detections are inherently noisy and false alarms confuse the situation. This is even more the situation when low detection thresholds are used to improve detection sensitivity as is done in US Patent Application Publication No. 2006/0238406. As a result, averaging the resulting amplitudes (or ratios) over multiple scans does not perform as well as one would hope due to incorrect associations. With a multi-target tracker operating independently on each of the scan matrices over time, high-quality confirmed tracks result. For each target, its track will preferably record the amplitude from each detection used in the formation of that track, and preferably smooth the sequence of amplitudes to form a more accurate target amplitude estimate within that particular beam. Now track-to-track association methods known to those skilled in the art can be used across the beams to associate tracks resulting from the series of first scan matrices with those resulting from the series of second scan matrices that belong to the same respective targets.

Finally, the ratio of amplitudes can preferably be computed on a scan-by-scan basis from the smoothed amplitude estimates from associated track pairs in order to compute a series of height estimates that are effectively smoothed over multiple scans, thereby resulting in more robust and more accurate height estimates. Alternative smoothing techniques are to smooth the per-scan height estimates or the per-scan amplitude ratios, but these methods tend to be less robust to interference and missed detections.

A related advantage of having good target height (or equivalently elevation angle) information is that more accurate estimates of target radar cross-section (RCS) are obtainable. RCS is a property of a target; however, it is estimated using target echo amplitude. Target echo amplitude is dependent on the two-way beam pattern, which can be characterized as having a gain in the azimuth direction and a gain in the elevation dimension. When the radar system knows both the azimuth and elevation angles associated with a particular target as in the present invention, then target amplitude can be directly converted to RCS using radar equation and beam pattern calibration methods known to those skilled in the art. If the system does not know where the target is relative to the (elevation) center of beam, then the target amplitude has an unknown beam gain factor, making a good target RCS estimate impossible.

Good RCS estimates can lead to the ability to better classify different classes of targets. For example, an eagle will have a larger RCS than a sparrow. Improving the quality of RCS estimates will ultimately improve one's ability to use these estimates along with other radar descriminants to classify targets.

The processed information produced by radar processor can be presented to the operator on a local real-time display. This information may include scan-converted video, target data including detection data (with time history) and track data, maps, user data (e.g. text, push pins) etc. Preferred embodiments have radar target data geo-referenced using a geographic information system (GIS) so that target data are tagged to earth co-ordinates. Preferably, a map is integrated with the radar display and provides a background on which is overlaid geo-referenced radar data.

The track data produced by preferred embodiments contains detailed (but compact) long-term behavior information on individual targets. For any given scenario, these data can be automatically tested for hazardous activity, in order to generate alerts. Because the information is detailed, alerts can reflect complex behavior, such as origins and destinations of birds, runway approaches, density, etc. Target detection, tracking and hazard recognition algorithms may be customized for specific hazards and scenarios. Alerts can include an audible alarm and display indication to an operator, or a transmitted message to a remote user. The low-bandwidth track and alert information can be easily sent to central locations, and directly to end users, providing economical, effective monitoring. Automated alerts may be sent to remote users who require them. This enables the radar surveillance system to run unattended with users alerted only when necessary. Furthermore, track displays can be provided to remote users to give them a clear picture of the situation when alerts arise. The system preferably exploits COTS communication technology to provide such remote alerts and displays inexpensively.

Many of the aforementioned radar processor features as well as features not mentioned above are described in the articles *Low-cost Radar Surveillance of Inland Waterways for Homeland Security Applications*, Weber, P et al., 2004 IEEE Radar Conference, Apr. 26-29, 2004, Philadelphia, Pa., and *Affordable Avian Radar Surveillance Systems for Natural Resource Management and BASH Applications*, Nohara, T J et al, 2005 IEEE International Radar Conference, May 9-12, 2005, Arlington, Va. and US Patent Application Publication No. 2006/0238406, all of which are incorporated herein by reference.

For avian radar applications, one radar system, or even several independently operating radar systems are often not enough to provide a high-performance, composite picture covering the area of interest. For any single radar, there are gaps in coverage due to obstructions, and the area covered may not be a wide enough. One or more radar sensor apparatuses can be connected to a network to distribute their composite information to remote users. Since the target data contain all of the important target information (date, time, position including height in accordance with the present invention, dynamics, plot size, intensity, etc.), remote situational awareness is easily realized. Radar systems as disclosed herein may be networked to a central monitoring station (CMS). In that case, the CMS has a fusion/display processor that processes, integrates (and/or fuses), displays and archives the data. In addition to monitoring live radar data, the CMS also provides the capability to play back past recorded radar data. Some of the performance improvements achievable through integration and fusion of data from radar networks include:

Spatial diversity against target fluctuations in RCS (necessary for small targets)

Spatial diversity for shadowing due to geographic obstructions

A recorder can store the target data including track data and detection data. Target data can easily be stored continuously, 24/7, without stressing the storage capacity of a COTS PC. These same data can be distributed over a network. The stored data can subsequently be played back through any computer running the radar processor software; it is not necessary that it be connected to a radar apparatus. This feature is useful for off-line analysis. Target data can be archived for longer-term investigations. The recorder supports continuous writing of target data directly to a database (as well as to other file formats). The database can reside locally on the radar processor computer, on another computer on the network, or on both. The database is used preferably for post-processing, for interaction with external geographical information systems (GIS) systems, for remote radar displays, for support for web services, and for further research and development (e.g. to investigate and develop target identification algorithms).

The applications towards which the present invention is directed require further research and development (R&D) in order to increase and establish knowledge concerning target behavior. This knowledge can be used, for example, for automatic target identification. Off-line analysis of target data can be used with ground-truth data to better understand bird signatures, which could then be used to develop bird identification algorithms. In BASH applications, knowing the kind of bird that is being tracked is valuable for forming an appropriate response (e.g. should aircraft delay take-offs and landings or make an evasive maneuver to increase safety). Databases can continuously store complete target detection and track data over extended periods of time in order to support such R&D activities. One can rapidly play back stored target data into the radar processor in order to study and analyze the data.

Particular features of our invention have been described herein. However, simple variations and extensions known to those skilled in the art are certainly within the scope and spirit of the present invention. This includes variations on integration of the functional blocks described herein. For example, the sampling system 8 could be integrated with the processor 11 forming a single functional unit, without departing from the spirit of the invention.

What is claimed is:

1. A 3D radar system comprising:
   an antenna;
   means operatively connected to said antenna for varying an effective elevation pointing direction of said antenna;
   a radar transmitter operatively connected to said antenna, said transmitter generating a radar signal for emission via said antenna;
   a radar receiver operatively connected to said antenna;
   an azimuth scanner operatively coupled to said antenna for rotating said antenna about an axis; and
   a processor operatively connected to said receiver, said processor being configured for detecting and localizing airborne targets in azimuth and range, said processor being further configured for estimating a height above a ground surface of each detected target based on relative amplitudes of echo returns as a function of elevation pointing direction of said antenna.

2. The system defined in claim 1 wherein said antenna includes means for generating at least two beams and said means for varying includes means for selecting a given beam for a given radar pulse.

3. The system defined in claim 2 wherein said means for generating and said means for selecting includes a high-power RF switch that rotates with said antenna about said axis, said switch being operable to cause (a) said radar pulse to be transmitted via said given beam and (b) pulse echo returns associated with said radar pulse to be received via said given beam.

4. The system defined in. claim 2 wherein said means for selecting includes a low-power RF switch that is stationary relative to said axis and does not rotate with said antenna, said switch being operable to direct pulse echo returns from said given beam to said receiver.

5. The system defined in claim 2 wherein said antenna is a reflector, said means for generating including multiple feeds.

6. The system defined in claim 2 wherein said antenna is a frequency-scanning antenna and said means for generating includes a variable-frequency transceiver that is tuned to generate said at least two beams.

7. The system defined in claim 2 wherein said antenna is a phased-array antenna and said means for generating and said means for selecting include a beam forming network.

8. The system defined in claim 2 wherein said antenna and said means for generating include two antennas oriented to provide respective beams with respective elevation pointing directions different from one another.

9. The system defined in claim 2 wherein said at least two beams are vertically stacked pencil beams and said means for varying includes an RF switch.

10. The system defined in claim 1 wherein said antenna is an elevation monopulse antenna and said radar receiver includes a dedicated receiver for each of a plurality of antenna receive channels, said means for varying including means for selecting from among the antenna receive channels for a given radar pulse.

11. The system defined in claim 10 wherein said antenna is a reflector with multiple feeds.

12. The system defined in claim 10 wherein the dedicated receivers are non-coherent and the associated receive channels are from the upper and lower beams of said antenna.

13. The system defined in claim 1 wherein said radar transmitter and said radar receiver are noncoherent.

14. The system defined in claim 1 wherein said radar transmitter and said radar receiver are from a COTS marine radar.

15. The system defined in claim 1 wherein said receiver has a digitized output.

16. The system defined in claim 1 wherein said means for varying includes an elevation scanner.

17. The system defined in claim 1 wherein said processor is a COTS PC.

18. The system defined in claim 1 where said processor executes integration, interference suppression, clutter suppression, and adaptive thresholding.

19. The system defined in claim 1 wherein said means for varying an effective elevation pointing direction includes components taken from the group consisting of mechanical components and electrical components.

20. The system defined in claim 19 wherein said means for varying an effective elevation pointing direction includes components taken from the group consisting of a plurality of vertically stacked feed horns, an RF switch for switching among a plurality of beams of different fixed elevation angles, a rotary joint for conveying signals from said antenna during rotation thereof in elevation, a dual-channel rotary joint and a hybrid, frequency-scanning apparatus, a beam forming network, a plurality of receive channels, a channel selector, and an elevation scanner.

21. The system defined in claim 1 wherein said means for varying an effective elevation pointing direction are means for varying the effective elevation pointing direction of said antenna while said antenna rotates about said axis.

22. A method of determining the heights of airborne targets above a ground surface, comprising:
    operating a radar system to illuminate and detect the targets in a search volume, said radar system having a radar antenna;
    during the operating of said radar system, varying an antenna elevation pointing angle of said radar antenna; and
    detecting and localizing targets on a plane, and estimating the height above a ground surface for each detected target from echo returns thereof received from said radar antenna pointed along at least two different elevation pointing angles, the estimating of the height including computing height estimates from relative amplitudes of said echo returns as a function of said elevation pointing angles.

23. The method defined in claim 22 wherein said varying comprises emitting a plurality of beams via said antenna.

24. The method defined in claim 23 wherein radar transmission and reception is alternated between said beams from pulse to pulse.

25. The method defined in claim 23 wherein radar transmission and reception is through all of said beams on every transmission pulse.

26. The method defined in claim 23 where said beams are vertically stacked pencil beams.

27. The method defined in claim 22 wherein said varying comprises operating an elevation scanner.

28. The method defined in claim 22 wherein said radar system includes at least two radar subsystems proximate to one another, said varying comprising operating said at least two radar subsystems so that each radar subsystem is pointed at a different elevation angle.

29. The method defined in claim 22 further comprising operating a processor to track the detected airborne targets.

30. The method defined in claim 22 wherein said estimating includes interpolating in elevation.

31. The method defined in claim 22 wherein said estimating includes using target tracks in an association process to identify tracks in different beams belonging to a common target, thereby enabling a smoothing and improving of height estimates.

32. The method defined in claim 22 further comprising using the height estimates further to estimate target radar cross-section.

33. The method defined in. claim 22 further comprising using the height estimates further for target classification.

34. The method defined in claim 22 further comprising distributing height information to a network.

35. The method defined in claim 22 further comprising automatically notifying or alerting users of hazards or situations of interest.

36. The method defined in claim 22 further comprising combining target height and range estimates and radar echo intensities to form accurate estimates of radar cross-sections.

37. The method defined in claim 22 farther comprising continually updating estimated dynamics vectors, including speed, heading, position, and height for each of said targets.

38. The method defined in claim 22 wherein said estimating is carried out for all targets detected in said search volume, to provide 3D localization of such targets.

39. The method defined in claim 22 wherein the operating of said radar system is continuous so that the search volume is scanned repeatedly at regular time intervals, causing targets to be repeatedly illuminated and detected.

40. The method defined in. claim 22 further comprising rotating or scanning said radar antenna in azimuth.

* * * * *